(12) United States Patent
Spencer

(10) Patent No.: US 12,462,624 B2
(45) Date of Patent: *Nov. 4, 2025

(54) SYSTEMS AND METHODS FOR MONITORING A CONDITION OF AN ENGINE

(71) Applicant: Emprise Corporation, Ledyard, CT (US)

(72) Inventor: Mark Spencer, Coleville, CA (US)

(73) Assignee: Emprise Corporation, Ledyard, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/079,642

(22) Filed: Mar. 14, 2025

(65) Prior Publication Data

US 2025/0322700 A1   Oct. 16, 2025

Related U.S. Application Data

(63) Continuation of application No. 18/633,310, filed on Apr. 11, 2024, now Pat. No. 12,277,813.

(51) Int. Cl.
| | |
|---|---|
| *G07C 5/08* | (2006.01) |
| *B63B 79/10* | (2020.01) |
| *F02D 41/22* | (2006.01) |
| *G07C 5/00* | (2006.01) |

(52) U.S. Cl.
CPC .......... *G07C 5/0825* (2013.01); *B63B 79/10* (2020.01); *F02D 41/22* (2013.01); *G07C 5/008* (2013.01); *F02D 2041/228* (2013.01); *F02D 2200/024* (2013.01)

(58) Field of Classification Search
CPC ...... G07C 5/0825; G07C 5/008; B63B 79/10; F02D 41/22; F02D 2041/228; F02D 2200/024
See application file for complete search history.

(56) References Cited

U.S. PATENT DOCUMENTS

| | | |
|---|---|---|
| 2,972,988 A | 2/1961 | Ranck |
| 3,924,457 A | 12/1975 | Oshima |
| 3,965,677 A | 6/1976 | Goto |
| 3,983,754 A | 10/1976 | Deguchi |
| 4,567,755 A | 2/1986 | Ootsuka |
| 5,144,929 A | 9/1992 | Hosoya |
| 5,193,513 A | 3/1993 | Marko |
| 5,392,642 A | 2/1995 | Tao |

(Continued)

*Primary Examiner* — Russell Frejd
(74) *Attorney, Agent, or Firm* — Farber LLC

(57) ABSTRACT

The present disclosure provides systems and methods for monitoring and correcting a condition of an engine. A system for monitoring an engine comprises a plurality of sensors each coupled to a cylinder of the engine and configured to detect pressure data from each cylinder, a controller coupled to the sensors and configured to receive the pressure data and a monitor coupled to the controller for displaying the pressure data. The controller comprises a processor and a computer-readable data storage device. The storage device stores program instructions that, when executed by the processor, stores the pressure data captured by the controller and parses or combines this data into at least one parameter that represents the condition of the engine and/or summarizes one or more issues that may affect engine performance. This provides valuable information to the user(s) in real time, allowing the user(s) to make immediate correction actions to the engine.

26 Claims, 12 Drawing Sheets

(56) References Cited

U.S. PATENT DOCUMENTS

| | | |
|---|---|---|
| 5,582,151 A | 12/1996 | Wertheimer |
| 5,623,909 A | 4/1997 | Wertheimer |
| 6,131,465 A | 10/2000 | Wlodarczyk |
| 6,243,641 B1 | 6/2001 | Andrews |
| 6,981,488 B2 | 1/2006 | Harris |
| 7,475,673 B1 | 1/2009 | Fattic |
| 2005/0056255 A1 | 3/2005 | Harris |
| 2009/0020102 A1 | 1/2009 | Fattic |
| 2017/0175661 A1 | 6/2017 | Kumar |
| 2017/0191439 A1 | 7/2017 | Jayaram |
| 2019/0128200 A1 | 5/2019 | Nagappa |
| 2023/0099571 A1 | 3/2023 | Plummer |

$$CBI = \frac{(\frac{\delta}{ave})*\#cyl}{(\#cyl - \#outliers)}$$

FIG. 12

TABLE 1

| ENGINE CBI=0.049 ||
|---|---|
| A-BANK CBI=0.054 | B-BANK CBI=0.037 |
| A-BANK PFP | B-BANK PFP |
| 2117 | 2512 |
| 2304 | 2274 |
| 2288 | 2369 |
| 2296 | 2284 |
| 2482 | 2331 |
| 2348 | 2402 |
| 2326 | 2444 |
| 2276 | 2420 |

FIG. 13

SYSTEMS AND METHODS FOR MONITORING A CONDITION OF AN ENGINE

CROSS-REFERENCE TO RELATED APPLICATIONS

This application is a continuation of U.S. non-provisional patent application Ser. No. 18/633,310, filed Apr. 11, 2024, the complete disclosure of which is incorporated herein by reference for all purposes.

TECHNICAL FIELD

This description generally relates to systems and methods for monitoring and/or correcting a condition of an engine and more particularly to systems for monitoring the condition of marine power systems comprising multiple diesel engines in real-time.

BACKGROUND

The operating conditions of marine power systems are complicated and changeable, as the sailing conditions of ships are harsh, and ships must enter and leave ports frequently. When a marine power system works over a long term in high temperatures, high humidity, and/or corrosive and/or vibrational environments, various faults and damages will occur in the equipment of the system, with negative effects on the performance of the entire power system. Marine power system faults can reduce navigation safety, lead to serious maritime accidents, and cause massive personal and property losses.

Marine power systems typically include anywhere from 2 to 6 diesel engines. A marine diesel engine is a type of reciprocating internal combustion engine that runs on either diesel or dual fuel. One parameter typically used for monitoring the condition of marine engines is cylinder pressure. Cylinder pressure measurement is mostly performed with piezoelectric high-temperature pressure sensors that are permanently installed through a mounting bore which has to be drilled in the cylinder head for this specific purpose. The sensors may also be mounted to the blowdown valves of each cylinder. Blowdown valves serve to depressurize the gas in the engine at critical times, such as shutdown, restart or in the case of an emergency.

One of the challenges with monitoring marine engines based on cylinder pressure measurement is that the engines are typically located in difficult to access areas of the vessel. For example, in a U.S. Navy littoral combat ship (LCS), the blowdown valves of each cylinder are located behind panels beneath the catwalk and, therefore, are not easily accessible by crew members. Crews are required to maneuver on, or around, insulated pipes to access the blowdown valves. In addition, the engine rooms typically have high pressure lines and conduits on each side of the catwalk that make it difficult to find a stable foot hold to stand while taking data.

Another challenge with monitoring the condition of marine engines is that the data collected by the crew members is prone to interpretation errors. Crew members are currently required to interpret any cylinder pressure imbalances and the severity of that imbalance based on their individual experience and proficiency, which can be subjective. Moreover, transmitting this data to onshore analysts for interpretation may take too long to correct the condition of the engine before any faults in the engines will cause negative effects on the performance of the entire power system.

Thus, it would be desirable to provide improved systems and methods for monitoring the condition of marine engines in real-time. It would be particularly desirable to provide a system that allows for immediate access to cylinder pressure data and interprets this data such that the user (e.g., the crew) may formulate corrective actions when warranted.

SUMMARY

Systems and methods for monitoring and correcting a condition of an engine are provided herein. The systems and methods may be configured for use with a variety of engine types, such as diesel, gas turbine, nuclear propulsion, electric, solar propulsion, steam, steam turbine propulsion and the like, and is particularly useful in diesel or gas turbine engines having two or more cylinders, such as two-stroke or 4-stroke internal combustion engines. The systems and methods may be particularly useful for V engines (or Vee engines) wherein the engine comprises a single crankshaft having two or more cylinder banks set at an angle between them relative to the crankshaft.

In one aspect, a system for monitoring an engine comprises a plurality of sensors each coupled to a cylinder of the engine and configured to detect pressure data from each cylinder, a controller wirelessly or directly coupled to the sensors and configured to receive the pressure data. The system further comprises a monitor coupled to the controller for displaying the pressure data.

In various embodiments, the controller comprises a processor and a computer-readable data storage device. The storage device stores program instructions that, when executed by the processor, stores the pressures captured by the controller and parses or combines the pressures from each of the cylinders into at least one parameter that represents the condition of the engine and/or summarizes one or more issues that may affect engine performance. Parsing the cylinder data into one or more parameters that represent a condition or grade of the overall engine provides valuable information to the user(s) in real time, which may allow the user(s) to, for example, make immediate correction actions to the engine, if and when necessary.

In various embodiments, the pressure data detected by the sensors comprises the peak firing pressure of each cylinder. The program instructions in the storage device allows the processor to parse or combine the peak firing pressures from each of the cylinders into a condition or grade that represents the overall condition of the engine. The grade may, for example, comprise a numerical grade, a relative grade, a pass/fail grade or the like. In some embodiments, the condition or grade may be based on all of the cylinders that share a common angle with the crank shaft, or an individual "bank" of the engine. The processor may be configured to determine an overall condition or grade of each bank of the engine and/or the overall engine.

In one embodiment, the parameter comprises a difference of magnitude between the peak firing pressures of each of the cylinders to determine whether the engine is in balance. In another embodiment, the parameter comprises an average of the peak cylinder pressures. The processor compares each of the peak firing pressures to the average pressure to determine a condition or grade of the engine.

In an exemplary embodiment, the processor or storage device includes program instructions that: (1) compares the peak firing pressure of each cylinder to the overall average of the firing pressures for all cylinders in an individual engine bank, or the overall engine; (2) determines whether each cylinder has a peak firing pressure above or below the average firing pressure by a threshold amount or percentage (i.e., determines outliers); (3) provides an overall condition or grade for the engine or engine bank based on the number of outlier cylinders and the total number of cylinders in the engine or engine bank. The threshold amount for outlier cylinders may be, for example, plus or minus about 15% to about 1% of the average cylinder pressure, or plus or minus about 10% to about 3%, or plus or minus about 5%.

In certain embodiments, the processor or storage device includes program instructions that converts a numerical value of the condition or grade or the engine or engine bank into a numerical or verbal grade. The grade may be based on a range of, for example, 1 to 20, 2 to 10, 3-8, or about 3 indicators. The grade may include, for example, a numerical grade, a color-coded grade, an alphabetic grade or the like. In an exemplary embodiment, the grade is based on three indicators (Good, Fair and Poor) and may be color coded for quick reference by the user in for example: Green equals Good, Yellow equals Fair and Red equals Poor.

In certain embodiments, the processor and/or storage program may be configured to determine a difference between the average cylinder peak firing pressures of each engine bank relative to the other engine banks in the engine.

In various embodiments, the controller is configured to display the peak firing pressures of each cylinder, or the overall condition or grade of each engine bank and/or the overall engine on the monitor. The monitor may comprise a heads-up display on a mobile device, such as a Smartphone, tablet, IWatch, external computer or the like. The mobile device may include a processor for controlling certain functions of the controller In certain embodiments, separate components of the controller and the mobile device generally communicate with one another wirelessly. Thus, the use of wireless technology avoids the inconvenience and distance limitations of interconnecting cables.

In various embodiments, the controller converts the peak firing pressure of each cylinder into a visual indicator and displays the visual indicator on the monitor. The visual indicator may be based on the normal peak firing pressure of the cylinder or the average peak firing pressures of each cylinder or all of the cylinders. For example, the visual indicator may display whether the peak firing pressure is equal to, above, or below the normal or average peak pressures. The controller may be configured to provide a verbal or visual alert to the user that the condition or grade of the engine is not within a certain range of parameters and that corrective actions may be necessary.

In various embodiments, the data storage device comprises historical data related to peak firing pressures and determines the condition of the engine by comparing the detected peak firing pressures with the historical values. In an exemplary embodiment, the storage device or processor may include an artificial neural network (i.e., an artificial intelligence or machine learning application) that allows the processor to develop computer-exercisable rules based on the pressure data captured from the cylinders and the historical data related to thereby further refine the process of recognizing and/or diagnosing the condition of the engine.

In various embodiments, the data storage device and/or processor is configured to generate a corrective action based on the condition of the engine, and to display that corrective action on the monitor. In one embodiment, the corrective action may include adjusting one or more parameters or the engine and/or shutting down one or more cylinders of the engine or shutting down the entire engine. In another embodiment, the corrective action may, for example, indicate that one or more cylinders are outside of the prescribed pressure range and require further investigation by the user(s).

In various embodiments, the plurality of sensors is disposed on blowdown valves coupled to each of the cylinders of the engine. The sensors may, for example, be secured between each cylinder and its respective blowdown valve. In an exemplary embodiment, each of the sensors is wirelessly or directly coupled to the controller such that pressure data from each cylinder may be continuously transmitted to the controller.

In another aspect, a monitoring device for mounting to a valve of an engine is provided. The device comprises a sensor and an adaptor comprising a housing coupled to the sensor. The adaptor has a first connector for removably coupling the housing to the valve and a second connector for removably coupling the housing to the engine.

The sensor may comprise any sensor suitable for detecting a pressure of the cylinder, such as fiber optic sensors, piezoelectric sensors, "PCT" sensors, microarray sensors, optical sensors (e.g., bioluminescence and fluorescence), microelectromechanical sensors, piezoelectric sensors, potentiometric sensors, amperometric sensors, conductometric sensors, nano sensors, or other suitable sensors. In an exemplary embodiment, the sensors comprise a fiber optic sensor or a piezo electric sensor.

In various embodiments, the adaptor is configured for positioning between the valve and the engine. In one such embodiment, the valve comprises a threaded connector for coupling to the engine and the first connector of the housing comprises a first mating feature configured for removable coupling to the threaded connector. In various embodiments, the second connector of the adaptor comprises a second mating feature for coupling to a cylinder of the engine.

In various embodiments, the adaptor comprises a third mating feature for coupling the sensor to the adaptor such that the sensor is disposed between the cylinder and the valve. In one such embodiment, the sensor is disposed on, or within, a threaded shaft. The third mating feature comprises a threaded connector configured for coupling to the thread shaft.

BRIEF DESCRIPTION OF THE DRAWINGS

The accompanying drawings, which are incorporated in and constitute a part of this specification, illustrate several embodiments of the disclosure and together with the description, explain the principles of the disclosure.

FIG. 12 illustrates a formula for the cylinder balance index (CBI); and

FIG. 13 illustrates an example of the display of peak firing pressure (PFP) data.

DESCRIPTION OF THE EMBODIMENTS

This description and the accompanying drawings illustrate exemplary embodiments and should not be taken as limiting, with the claims defining the scope of the present disclosure, including equivalents. Various mechanical, compositional, structural, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Systems and methods for monitoring and/or correcting a condition of an engine provided herein. The systems and methods may be configured for use with a variety of engines, such as a diesel, gas turbine, nuclear propulsion, electric, solar propulsion, steam, steam turbine propulsion and the like, and is particularly useful in diesel or gas turbine engines having two or more cylinders, such as two-stroke or 4-stroke internal combustion engines. The systems and methods may be particularly useful for V engines (or Vee engines) wherein the engine comprises a single crankshaft having two or more cylinder banks each set at an angle between them.

Figure 1:
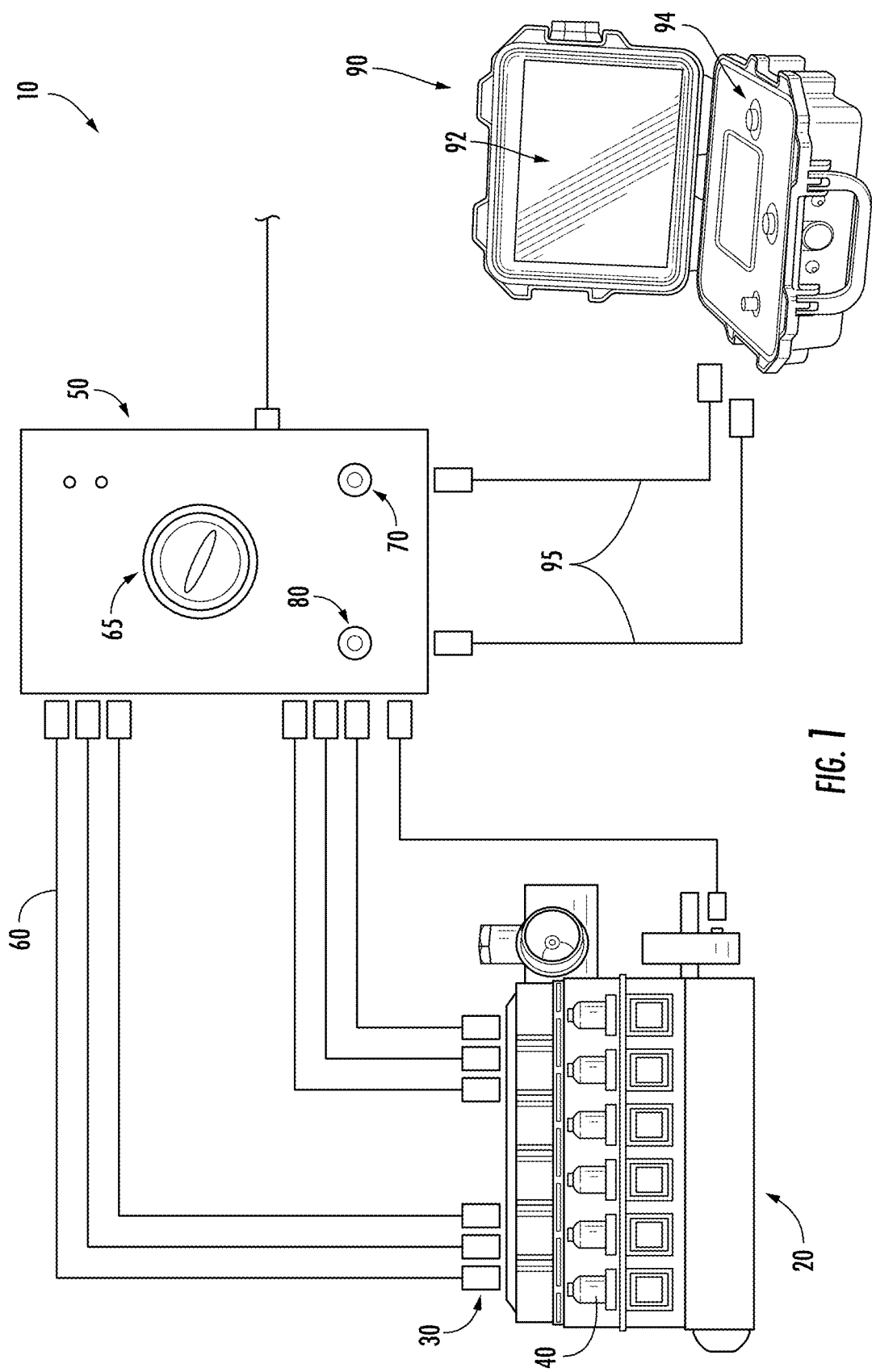
FIG. 1 illustrates a system for monitoring and/or correcting a condition of an engine.

Referring now to FIG. 1, a system 10 for monitoring and/or correcting a condition of an engine 20 comprises a plurality of pressure sensors 30 each coupled to a cylinder 40 of engine 20. Sensors 30 may be coupled to one, two, three or more than three of the cylinders 40. In an example embodiment, sensors 30 are coupled to each and all of the cylinders 40. Sensors 30 may comprise any suitable sensor for detecting pressure, such as fiber optic sensors, piezoelectric sensors, "PCT" sensors, microarray sensors, optical sensors (e.g., bioluminescence and fluorescence), microelectromechanical sensors, piezoelectric sensors, potentiometric sensors, amperometric sensors, conductometric sensors, nano sensors, or other suitable sensors.

In one embodiment, sensors 30 comprise a piezoelectric sensor that uses the piezoelectric effect to measure changes in pressure by converting them into an electrical charge. In another embodiment, sensors 30 comprise optical fibers that measure pressure by modifying a fiber so that the pressure modulates the intensity, phase, polarization, wavelength, or transit time of light passing through the fiber. In another embodiment, sensors 30 comprise fiber optic sensors coupled to a valve of each cylinder 40 and are configured to detect the peak firing pressure of each cylinder (discussed in more below). The peak firing pressure of individual cylinders is an overall metric that summarizes the condition of the engine (i.e., significant issues that may affect engine performance).

System 10 further comprises a housing 50 for enclosing electrical wiring and switching circuitry and a plurality of electrical connectors 60 coupling sensors 30 to housing. Connectors 60 may comprise any suitable electrical connector, such as for example, plug-in type connectors, push pull connectors, cable/wire connectors, board-to board connectors or the like. In one embodiment, connectors 60 comprise circular push pull connectors. Alternatively, sensors 40 may be wirelessly coupled to housing 50.

Housing 50 may comprise any suitable electrical enclosure intended for indoor or outdoor use primarily to provide a degree of protection against windblown dust and rain, splashing water, and hose directed water; undamaged by ice which forms on the enclosure. In an exemplary embodiment, housing 50 comprises a gasketed door enclosure rated by the National Electric Manufacturer's Association (NEMA), such as a NEMA 4 rated enclosure. Housing 50 may comprise an electrical switch 65, such as a rotary switch, configured to switch between the outputs of each sensor 30. Switch 65 is suitably coupled to an output 70, which may comprise any suitable electrical connector, such plug-in type connectors, push pull connectors, cable/wire connectors, board-to board connectors or the like. In certain embodiments, housing 50 may further include a diagnostic plug 80 for testing and running diagnostics on the circuitry within housing 50. For example, plug 80 may comprise a TDC marker unit that produces a signal to measure the timing of the engine cylinders.

System 10 further comprises a computing device, such as controller or processor (not shown), which may be housed in a remote device 90. As discussed in more detail below, remote device 90 may further a user interface 94 and a monitor 92. Housing 50 may be electrically coupled to remote device 90 in any suitable manner, wired, wireless or the like. In one embodiment, system 10 further comprises one or more electrical connectors 95, such as push pull connectors, that directly couple housing 50 to device 90 for transferring the data detected by sensors 30 to the computing device.

Figure 2:
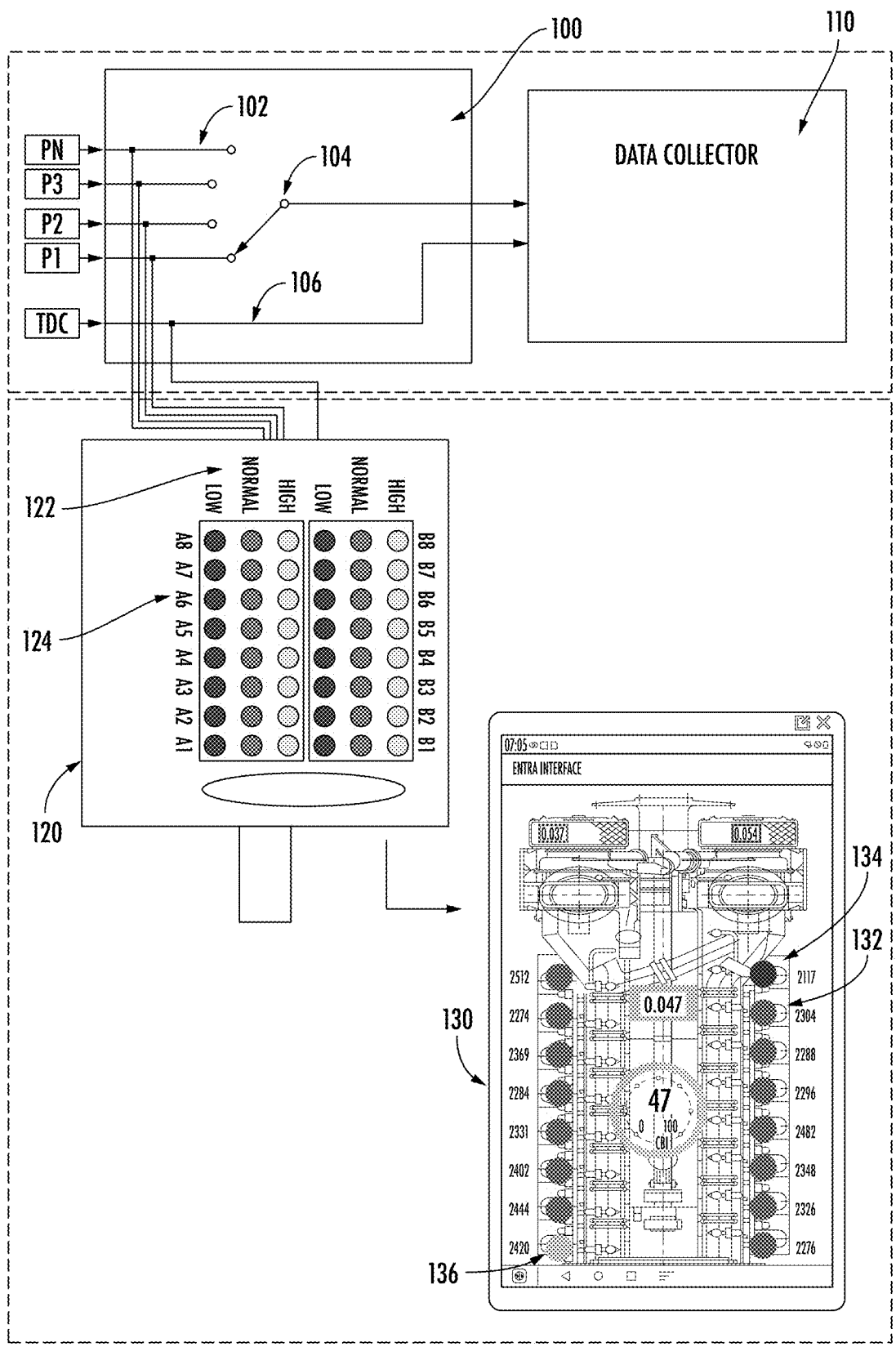
FIG. 2 schematically illustrates certain components of the system of FIG. 1.
Figure 3:
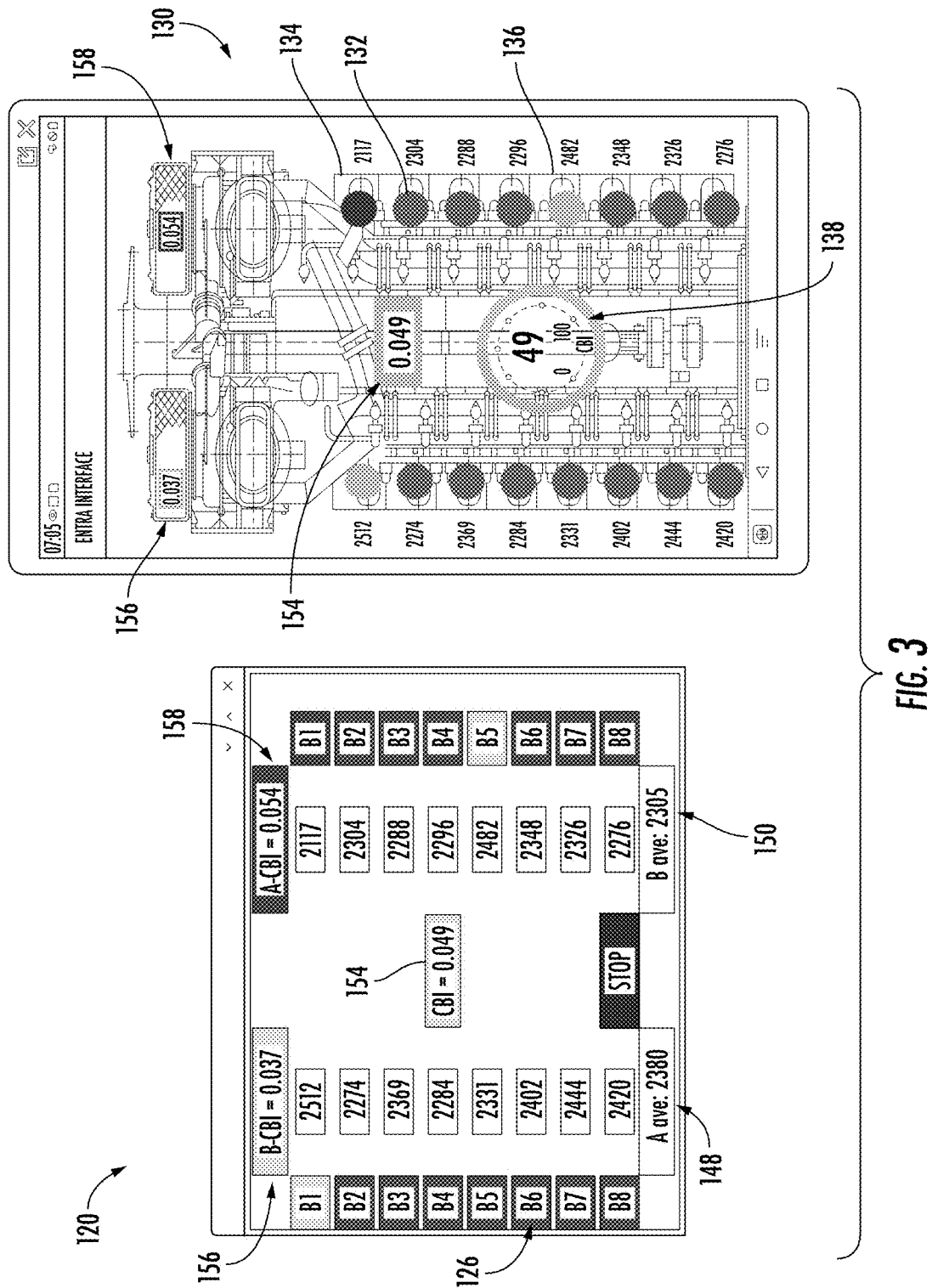
FIG. 3 illustrates multiple user interfaces for use with the system of FIG. 1.

Referring now to FIGS. 2 and 3, housing 50 comprises a sensor switching box 100 and a data collector 110. Switching box 100 comprises electrical circuits 102 for each of the sensors 30 and a switching circuit 104 for transferring the output of switching box 100 between each sensor 30 to data collector 110 to capture the data detected by sensors 30. Switching box 100 may also include an electrical circuit 106 coupled to diagnostic plug 80. In certain embodiment, box 100 comprises two circuit boards and an LCD display (not shown), such as a VGA sized display with a capacitive touchscreen. The display incorporates an integral LED backlight to ensure long life. The main board carries out data acquisition and processing tasks while the lower interface board conditions the incoming signals for compatibility with the main board. Both boards are powered from an internal 24 Vdc supply System 10 further includes a computing device, such as a processor or controller 120 coupled to data collector 110 and switching box 100. The computing device includes a computer-readable storage device and/or software application that stores program instructions that allow the processor to compile the data detected by sensors 30. System 10 further includes a monitor for displaying real-time data related to the data detected by sensors 30 and generated by the computing device. The monitor may be a fixed display and/or a heads-up display on a mobile device. System 10 may further comprise a data logger 130 configured to verify the longevity of the pressure sensors 130.

The monitor may be coupled to computing device 120 and may include a variety of screens that provide data compiled by the computing device. In one example, the monitor may include a screen that provides data 124 for each individual sensor 30, such as for example, the peak firing pressure of each cylinder detected by the sensors. The monitor may further provide information that compares the peak firing pressure of each cylinder with an average peak firing pressure, a normal peak firing pressure or some other parameter. The monitor may further provide a visual indicator 122 of this comparison. For example, the monitor may include colors or other visual indicators 122 or other qualitative measures/indicators that immediately indicates to the user whether the peak firing pressure is a threshold level above average or normal (yellow), a threshold level below average or normal (red) or within a certain percentage of these parameters (green). These examples of qualitative measure/indicator examples are non-limiting and may be derived from the actual pressure data (quantitative) to show a qualitative measure (e.g. red, green, yellow; good, average, poor; scales of 1-10 (or other ranges)). Thus, instead of or in addition to displaying the actual pressure information to the user, the qualitative measure allows for fast and consistent interpretation of the data.

Data logger 130 may also include a monitor wherein cylinder pressures are presented along with a visual indicator that immediately allows the user to understand whether the pressures are a threshold level above average or normal 136 (yellow), a threshold level below average or normal 134 (red) or within a certain percentage of these parameters 132 (green).

The computing device can include one or more processors (e.g., microprocessor, microchip, or application-specific integrated circuit), one or more memory devices (e.g., random-access memory and/or read-only memory), and I/O interface, and a communication interface. In some implementations, the processor includes a real-time clock that produces one or more clock signals that can be used to timestamp data. The memory devices can include a local memory (e.g., a random-access memory and a cache memory) employed during execution of program instructions. Additionally, the computing device can include at least one communication channel (e.g., a data bus) by which it communicates with the monitor, the memory device, the I/O interface, and the communication interface.

It is understood that the computing device can comprise any general-purpose computing article of manufacture capable of executing computer program instructions installed thereon. However, the computing device is only representative of various possible computing devices that can perform the processes described herein. To this extent, in implementations, the functionality provided by the computing device can be any combination of general and/or specific purpose hardware and/or computer program instructions. In each implementation, the program instructions and hardware can be created using standard programming and engineering techniques.

In one embodiment, the computer device comprises processor and a computer-readable data storage device storing program instructions that, when executed by the processor, the program instructions, stores the peak firing pressures captured by the controller and determines a condition of the engine based on the peak firing pressures. The storage device can comprise computer-readable, non-volatile hardware storage devices that store information and program instructions.

The I/O interface can include one or more devices that enable the user to interact with the monitor 120 such as, for example, a touchscreen display, a keypad, one or more selectors, one or more indicators. In accordance with aspects of the present disclosure, the I/O interface can provide a user interface, as previously described herein and additionally described below.

The communication interface can include any device interconnecting the computing device with an information network (e.g., a local area network, a wide area network, and the Internet) enabling the computing device to communicate with other computing systems and information storage systems. In some implementations, the communication interface uses communication protocols that establish secure e communication links satisfying HIPPA requirements.

The processor executes computer program instructions (e.g., an operating system and/or application programs), which can be stored in the memory device and/or the storage device. The program instructions preferably combine the peak firing pressures from each of the cylinders into at least one parameter that represents the condition of the engine. The parameter(s) may comprise, for example, numerical differences between the peak firing pressures of the cylinders, a magnitude of said differences between the peak firing pressures or an average of the peak pressures of the cylinders. The parameter may be based on certain algorithms and/or a database of historical archived analyses or historical peak pressure data to generate a quantified condition grade of the engine based on the detected peak firing pressures.

In an exemplary embodiment, the computing device applies an algorithm that calculates a cylinder balance index (CBI) based on the peak firing pressures and generates a numerical and verbal grade of the condition of the engine.

In an exemplary embodiment, the algorithm is a formula based on the number of cylinders and the number of cylinders that are outliers (i.e., cylinders having a peak firing pressure above or below a threshold amount). In one such embodiment, this formula is: CBI equals: (1) the difference between the actual peak firing pressure of each cylinder divided by the average cylinder pressure, which is then multiplied by the number of cylinders in the engine; divided by (2) the number of cylinders in the engine minus the number of outliers (i.e., cylinders that have peak firing pressure outside of a prescribed range).

In a perfectly balanced diesel engine, all the individual cylinder peak firing pressures (PFPs) are equal. In a practical diesel engine, the PFPs of individual cylinders follow a natural Gaussian distribution, that distribution is informally referred to as a bell curve. The wider the bell curve, the greater the dispersion of the PFPs within the curve, and therefore the greater the imbalance in the distribution of the PFPs. The population based Standard Deviation ($\sigma$) algorithm, the result of which describes the dispersion of the PFPs, is the primary statistical analysis tool used to calculate the CBI:

$$\sigma = \sqrt{\frac{\sum(X - \overline{X})^2}{n}}$$

where X equals the population average, $\overline{X}$ equals the discrete population sample values, and n equals the size of the population.

The CBI is further refined by: (1) normalizing the Standard Deviation by dividing the σ term by the average PFP (red highlighted expression in the equation below), this compensates the CBI for various load conditions and engine types; (2) bias the CBI to consider the proportional number of outlier cylinders (cylinders that have PFPs outside of a prescribed range) (green highlight expression in the equation below) relative to the total number of cylinders (engine or bank), this amplifies or attenuates the CBI value based on the percentage of outlier cylinders (see FIG. 12).

In a perfectly balanced engine (or engine bank), the Standard Deviation equals zero making the CBI=0. As the dispersion of the cylinder PFPs increases, the CBI increases. The CBI further increases as the number of outlier cylinders relative to the total number of cylinders increases. When analyzing Vee diesel engine configurations, it is common practice to consider the individual banks of the Vee engine as separate engines that share a common crank shaft, therefore there are individual bank CBIs as well as an overall engine CBI.

The engine data displayed in FIG. 3 will be used as an example of the application of the CBI algorithm. The PFP data in FIG. 3 is displayed in FIG. 13.

In this example, an outlier cylinder is defined as a cylinder that has a PFP that is outside (greater than, or less than as appropriate) plus or minus 5 percent of the overall engine (or bank) PFP average (depending on if calculating the engine CBI or individual bank CBI). In this example, cylinder A-1 has a PFP that is less than minus 5 percent of the average PFP and is depicted in red, cylinders A-5 and B-1 have PFPs that are greater than plus 5 percent of the average PFP and are depicted in yellow. The total number of outliers is 3, the total number of cylinders (for the engine) is 16. The cylinder PFPs, the number of outliers, and the total number of cylinders for the engine are inserted into the CBI algorithm with the resulting engine CBI of 0.049.

Similarly, the individual bank CBIs are calculated using bank specific averages, number of outliers, and number of cylinders in the bank. In this example, the A bank CBI is 0.054, the B bank CBI is 0.037.

The demarcation of the numerical or verbal CBI grade is based on: (1) Good=0.000≤0.035 (green); (2) Fair=0.036≤0.050 (yellow); and (3) Poor=0.051≤(red). In this example, the maintenance technicians would focus on cylinder A-1 to determine corrective actions necessary to improve the combustion performance of this cylinder first, then address the other outlier cylinders as needed (there is significant interaction between cylinders, changes in one cylinder will impact other cylinders in the engine). They would also focus attention on the A bank because of the worse balance condition of that bank.

In certain embodiments, the computing device may be aided by an artificial neural network (e.g., machine learning or artificial intelligence). Machine learning is the scientific study of algorithms and statistical models that computer systems use to perform a specific task without using explicit instructions, relying on patterns and inference instead. Machine learning algorithms build a mathematical model based on sample data, known as "training data", in order to make predictions or decisions without being explicitly programmed to perform the task. The artificial neural network may use algorithms, heuristics, pattern matching, rules, deep learning and/or cognitive computing to approximate conclusions without direct human input. Because the AI network can identify meaningful relationships in raw data, it can be used to support diagnosing, treating, and predicting outcomes in many medical situations.

The artificial neural network may include one or more trained machine learning algorithms that process the data received from sensors 30 and compares this data with data within a memory. The memory may be used for short-term storage of information. For example, the memory may be RAM memory. The memory may additionally or alternatively be used for longer-term storage of information. For example, the memory may be flash memory or solid state memory. In the alternative, the data from sensors 30 may be stored remotely in the memory by the processor, for example in a cloud-based computing system.

FIG. 3 illustrates an expanded view of visual indicators that may be displayed by the monitors coupled to the computing device. As shown, a monitor 120 may include, for example, the peak firing pressure of each individual cylinder of the engine (labeled 126), the average peak firing pressures (labeled 148, 150), the CBI as calculated pursuant to the above formula (labeled 138 and 154) and the difference between the peak firing pressures and the CBI (labeled 156 and 158).

The CBI determination of diesel engines, such as Vee configured diesel engines, includes the CBI for the overall engine and the CBI of the individual banks of the Vee engine. In this case, the number labeled 154 (e.g., 0.049) displays the overall engine CBI based on 16 cylinders and 3 total outliers. The number labeled 138 is an alternative dial display of the overall engine CBI. Labeled number 158 displays the CBI for the A-bank based on the 8 cylinders and 2 outliers of the A-bank. Labeled number 156 displays the CBI for the B-bank based on the 8 cylinders and 1 outlier of the B-bank. Significant differences between individual bank average PFPs (labels 148 and 150) would indicate discrepancies in the fuel distribution linkages feeding fuel to the individual banks.

Figure 4:
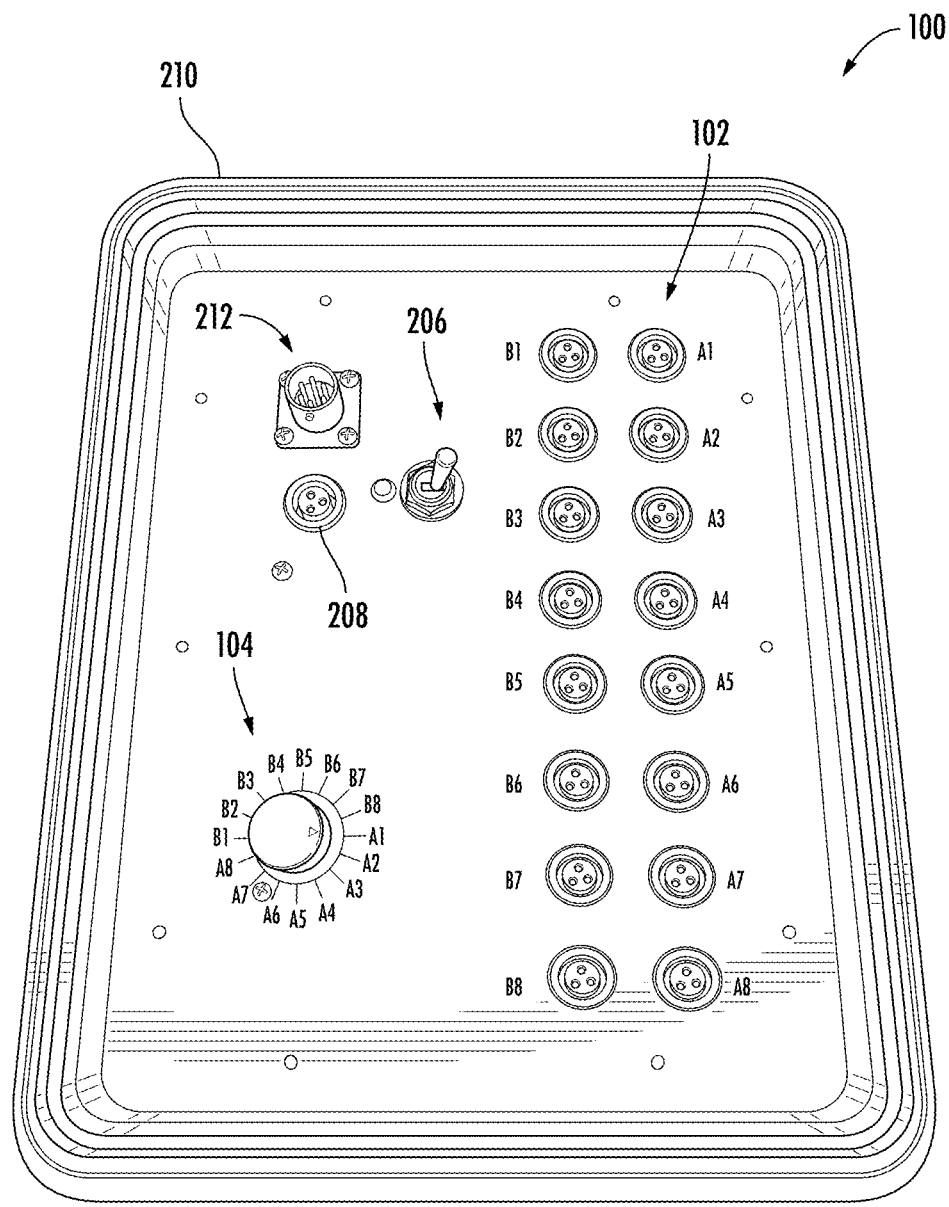
FIG. 4 is a front view of a user interface for use with the system of FIG. 1.

FIG. 4 illustrates a detailed illustration of sensor switch box 100 for use with system 10. As shown, box 100 comprises a housing 210 that includes one or more user interfaces 104, such as knobs, buttons or the like, for selecting one of the cylinders in the engine. Interface 104 may comprise a rotary switch that connectors the indicated pressure sensor to the data collector 110 shown in FIG. 2. The pressure sensors are continuously connected to computing device 120 and, therefore, rotary switch 104 is generally not used during data collection. Housing 210 may further comprise pressure sensor connectors 102 for coupling each of the sensors to box 100. Pressure sensor connectors 102 connect the individual pressure sensors to switching box 100. In an exemplary embodiment, connectors 102 comprise 3-pin connectors configured to receive 3-pin plugs from each of the pressure sensors.

Housing 210 may further comprise an AC to DC (24 volts at 3 amps) power supply that provides power to the pressure sensors during data collection. Sensor power and TDC sensor power is supplied to data collector 110 when data is being collected by data collector 100. Housing 210 may further include a power switch 206, a cylinder signal input 208 and a diagnostic input 212.

Figure 5:
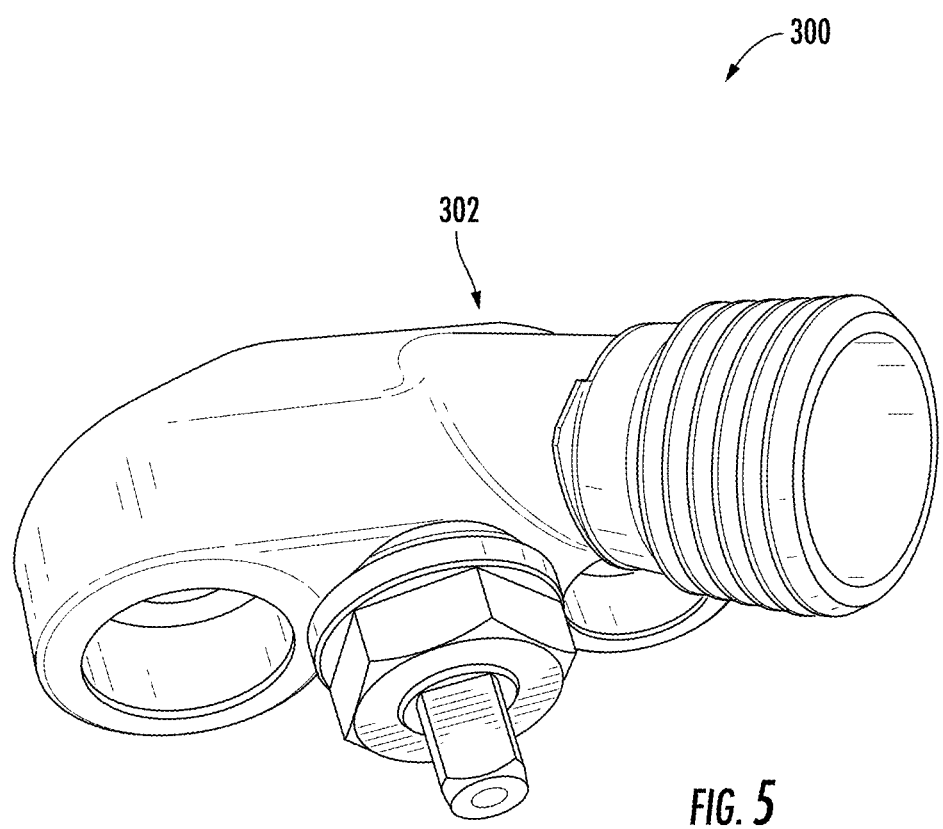
FIG. 5 illustrates a representative blowdown valve for an engine.
Figure 6:
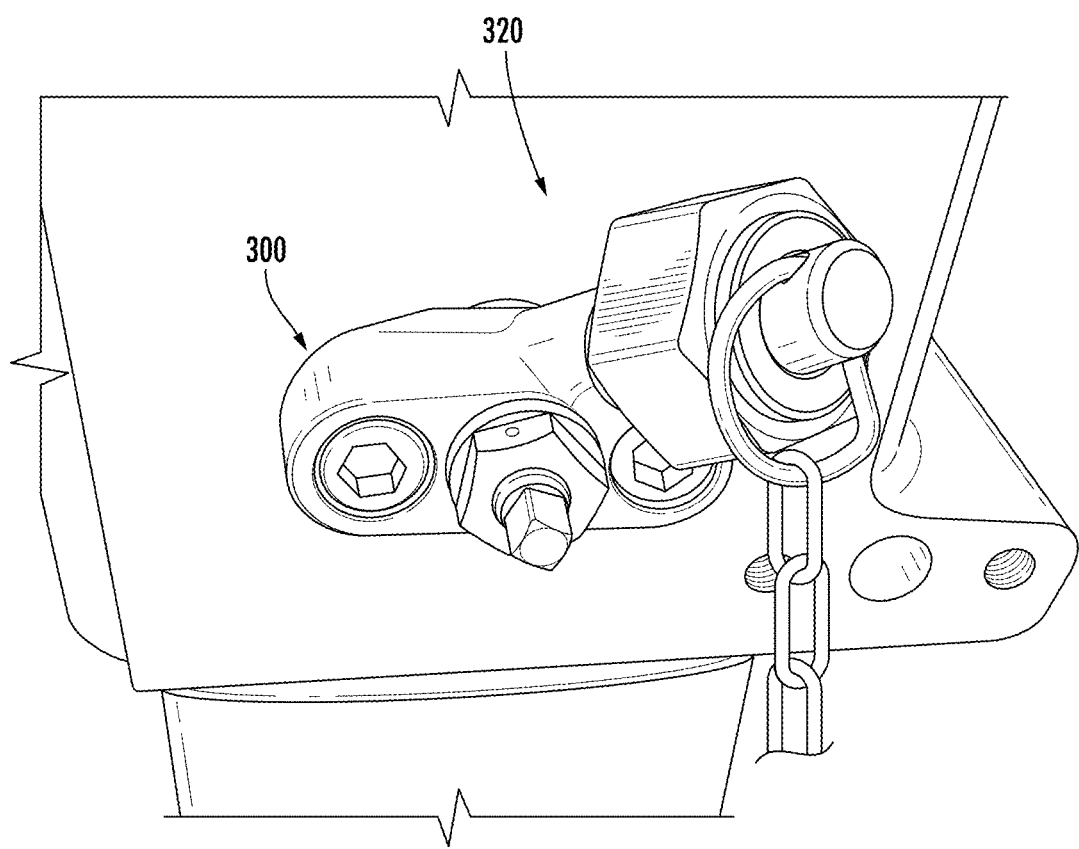
FIG. 6 illustrates the blowdown value of FIG. 5 coupled to a cylinder of an engine.

Referring now to FIGS. 5-12, one embodiment of an adaptor 400 for mounting a sensor to a blowdown valve 300 of an engine 320 will now be described. Blowdown valves are used to vent the impurities, sediment, and other solids that are present in boiler water. They are opened periodically to prevent buildup. They are also used to regulate the conductivity of the water in a boiler, because higher electrical conductivity causes scale to build up faster. Blowdown valves serve to depressurize the gas in the engine at critical times, such as shutdown, restart or in the case of an emergency. FIG. 5 illustrates one representative blowdown valve 300 that comprises a main body or cylinder liner 302 that may be installed in the crankcase with a spacer and held in place by the cylinder head of an engine 320 and the spacer (see FIG. 6).

Figure 7A:
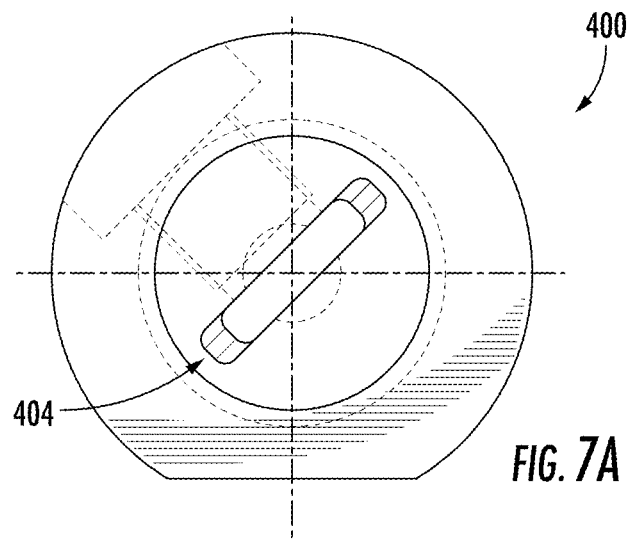
FIG. 7A is a side view of an adaptor of the system of FIG. 1.
Figure 7B:
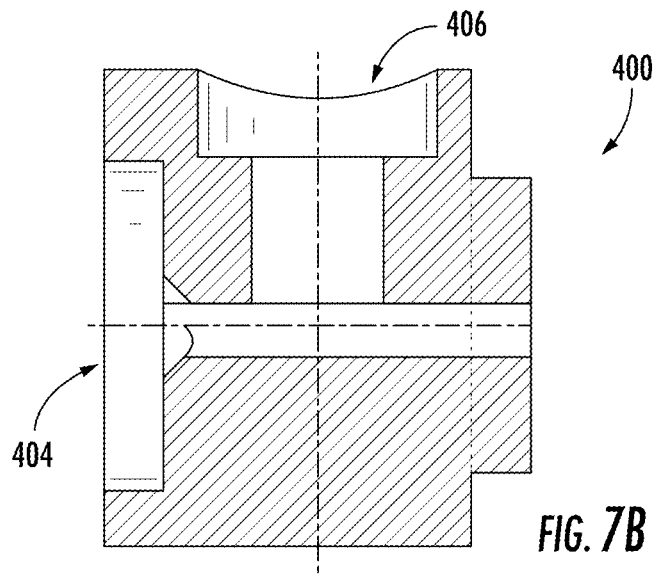
FIG. 7B is a cross-sectional view of the adaptor of FIG. 7A.
Figure 7C:
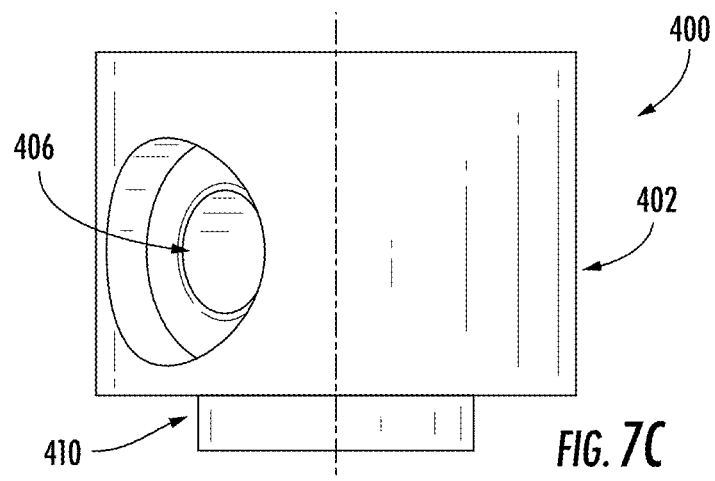
FIG. 7C is a top view of the adaptor of FIG. 7A.

FIGS. 7A-7C illustrate an adaptor 400 for coupling a sensor 440 (see FIG. 8) to blowdown valve 300. As shown, adaptor 400 comprises a main body 402 configured for positioning between valve 300 and engine 320. Main body 402 comprises a first mating feature 410 configured for coupling to a threaded connector 330 of blowdown valve 300 (see FIG. 9). First mating feature 410 may comprise any suitable connector for removably coupling adaptor 400 to valve 300. In an exemplary embodiment, mating feature 410 comprises the same, or a similar, connector that is used to couple engine 320 to valve 300. Main body 402 comprises a second mating feature 404 configured for coupling to a cylinder of engine 320. The second mating feature 404 preferably comprises the same, or similar, connector as valve 300. Thus, adaptor 400 couples to blowdown valve 300 in the same manner as valve coupled to engine, simply being inserted between the valve and the engine. In certain embodiments, first and/or second mating features 410, 404 may include a washer, such as a copper crush washer, to distribute the load of mating features 410, 404

Figure 8:
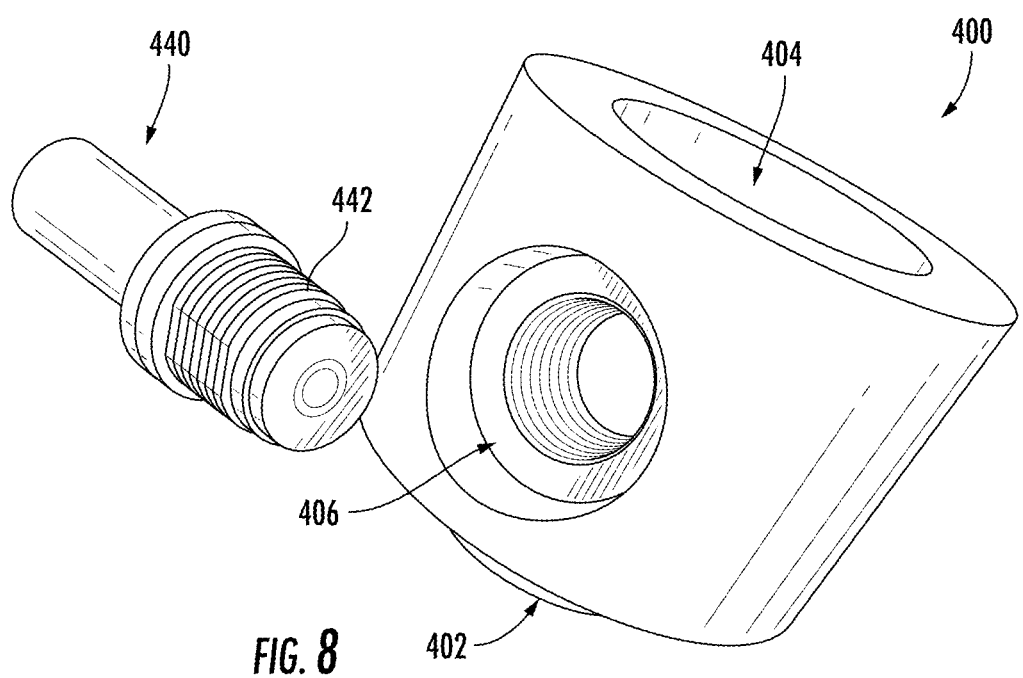
FIG. 8 is a perspective view of the adaptor and a sensor of the system of FIG. 1.
Figure 9:
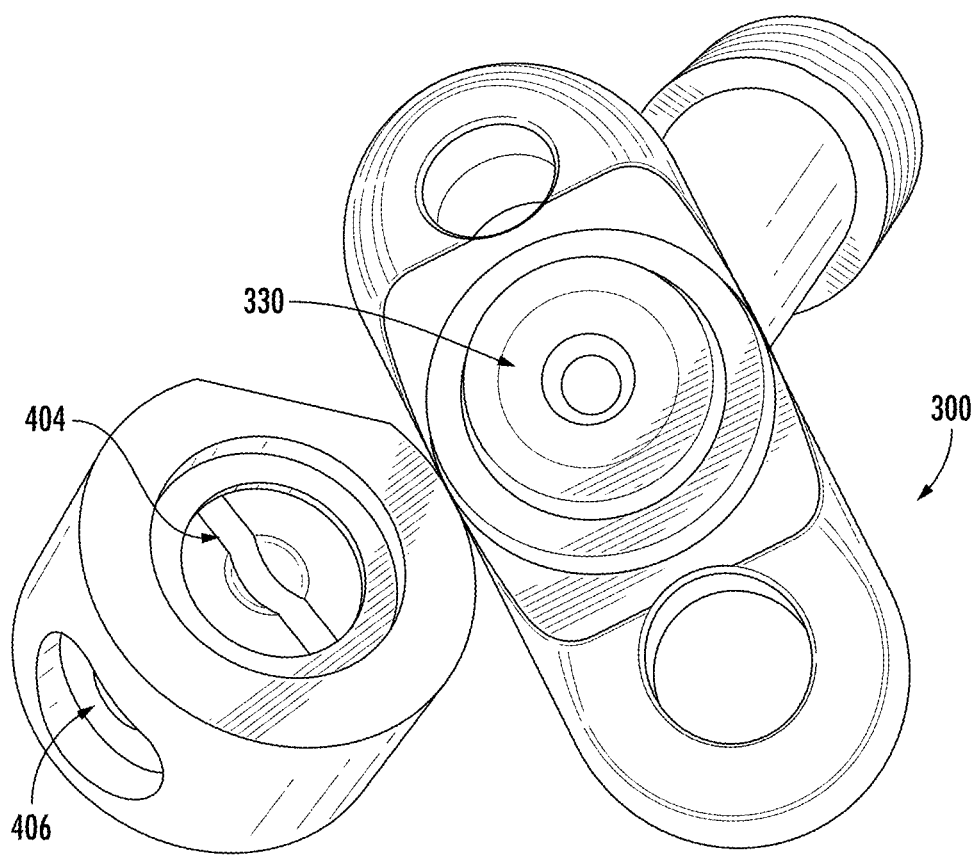
FIG. 9 is a perspective view of the adaptor and the blowdown valve.
Figure 10:
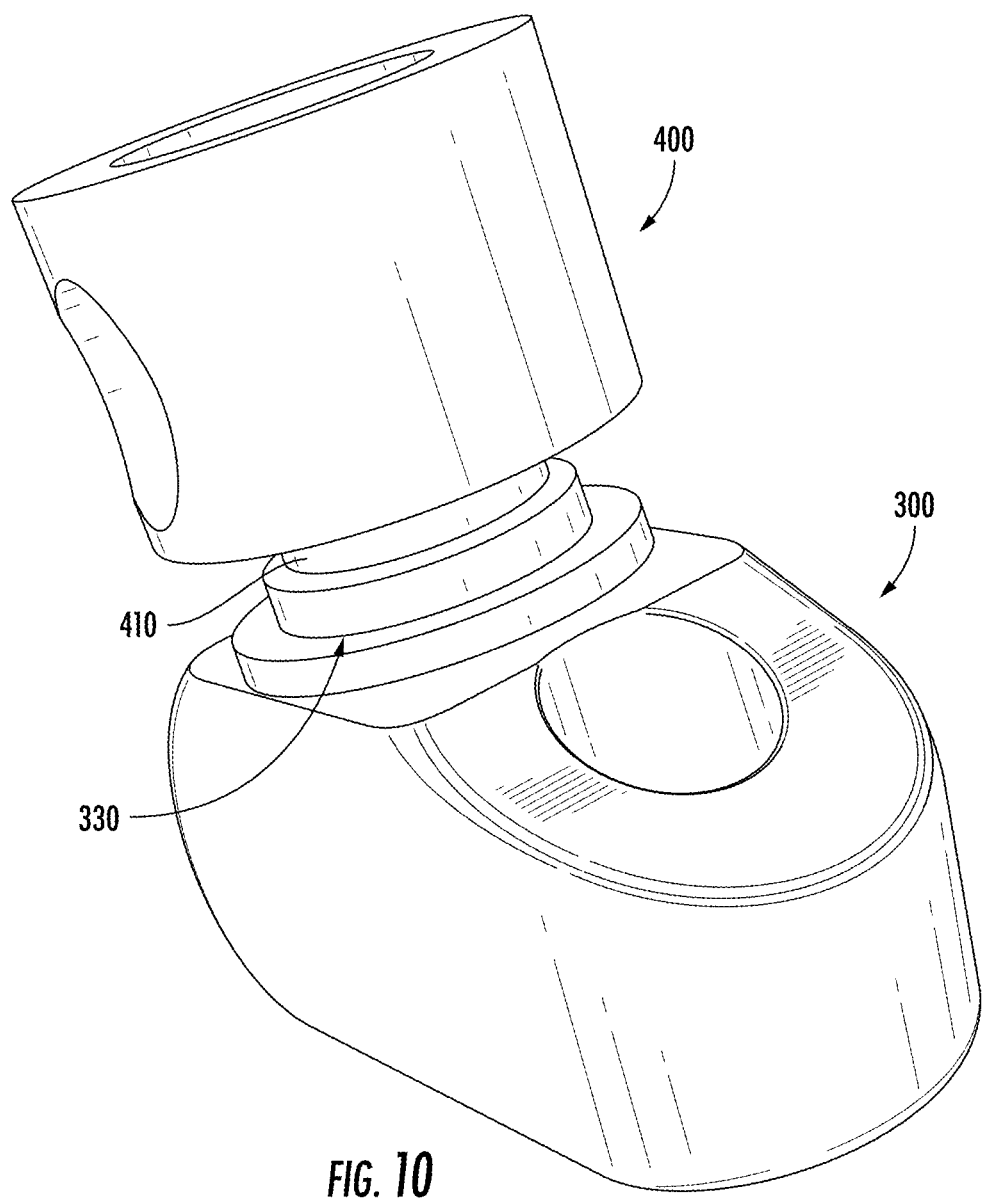
FIG. 10 illustrates the adaptor coupled to the blowdown valve.

As shown in FIG. 8, adaptor 400 further comprising a third mating feature 406 for coupling to a sensor 440. Third mating feature 406 may comprise an internal threaded channel for receiving an external threaded rod 442 that houses sensor 440. In an exemplary embodiment, the internal channel extends through a circumferential surface of main body 402 such that sensor 440 is generally disposed exterior to adaptor 400 between valve 300 and engine 320 (see FIG. 11).

Figure 11:
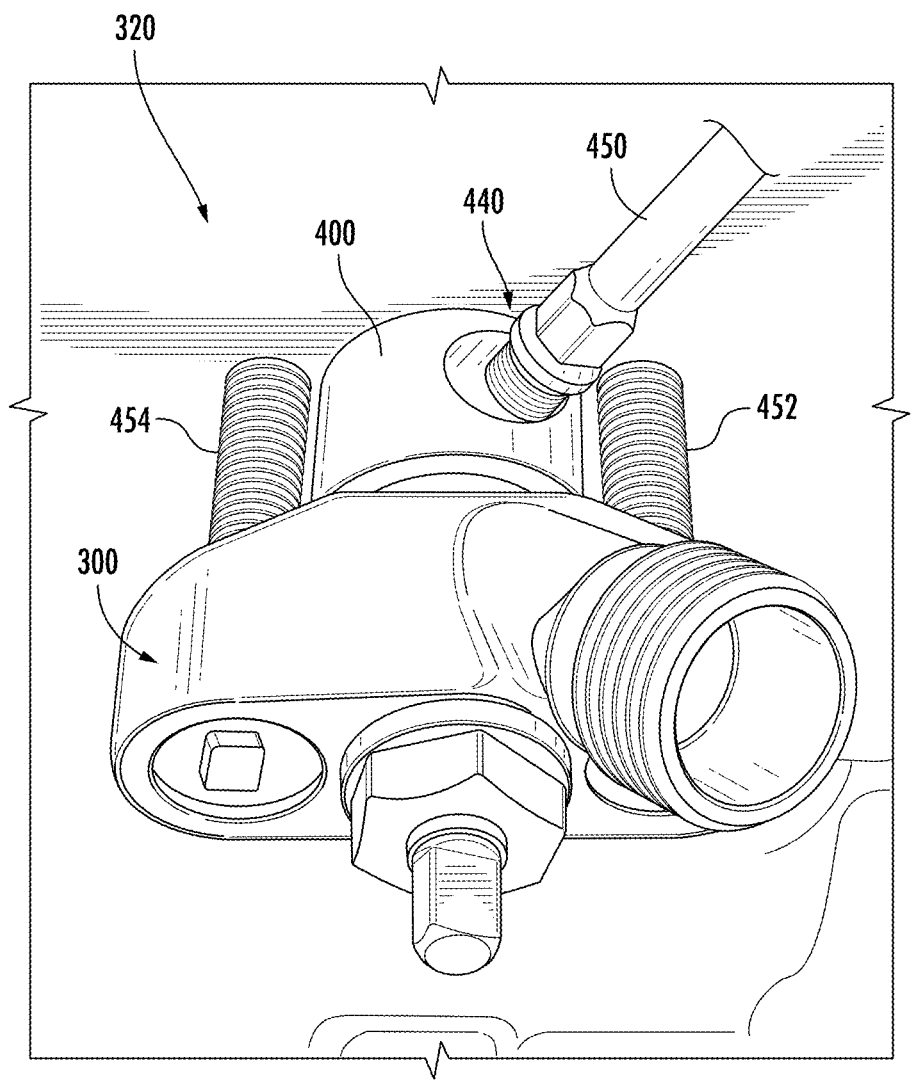
FIG. 11 illustrates the adaptor positioned between the engine cylinder and the blowdown valve.

As shown in FIG. 11, adaptor 400 may further include one or more elements for spacing blowdown valve 300 away from engine to provide room for adaptor therebetween. In an exemplary embodiment, these elements comprise connectors, such as screws 452, 454 that mount blowdown valve 300 to engine in a spaced relationship that allows for adaptor 400 to be secured between valve 300 and engine 400. The system may further include a connector 450 for coupling sensor 440 to the data collection portion of the system, such as housing 50 shown in FIG. 1. Alternatively, sensor 440 may include a wireless transmitter that wirelessly transmits date to a remove source, such as the computing device.

Other embodiments will be apparent to those skilled in the art from consideration of the specification and practice of the embodiment disclosed herein. It is intended that the specification and examples be considered as exemplary only, with a true scope and spirit of the embodiment being indicated by the following claims.

For example, in a first aspect, a first embodiment is a monitoring device for mounting to a valve of an engine. The device comprises a sensor and an adaptor comprising a housing coupled to the sensor and having a first connector for removably coupling the housing to the valve and a second connector for removably coupling the housing to the engine.

A second embodiment is the first embodiment wherein the sensor comprises a pressure sensor.

A third embodiment is any combination of the first two embodiments, wherein the sensor comprises a fiber optic sensor.

A $4^{th}$ embodiment is any combination of the first 3 embodiments, wherein the sensor comprises a piezo electric sensor.

A $5^{th}$ embodiment is any combination of the first 4 embodiments, wherein the sensor detects a firing pressure of a cylinder of the engine.

A $6^{th}$ embodiment is any combination of the first 5 embodiments, wherein the adaptor is configured for positioning between the engine and the valve.

A $7^{th}$ embodiment is any combination of the first 6 embodiments, wherein the valve comprises a threaded connector for coupling to the engine, wherein the first connector of the housing comprises a first mating feature configured for removable coupling to the threaded connector.

An $8^{th}$ embodiment is any combination of the first 7 embodiments, wherein the first connector comprises a washer.

A $9^{th}$ embodiment is any combination of the first 8 embodiments, wherein the second connector comprising a second mating feature for coupling to a cylinder of the engine.

A $10^{th}$ embodiment is any combination of the first 9 embodiments, wherein the adaptor comprises a third mating feature for coupling the sensor to the adaptor such that the sensor is disposed between the cylinder and the valve.

An $11^{th}$ embodiment is any combination of the first 10 embodiments, further comprising a threaded shaft, the sensor being disposed on, or within, the threaded shaft, and wherein the third mating feature comprises a threaded connector configured for coupling to the thread shaft.

A $12^{th}$ embodiment is any combination of the first 11 embodiments, further comprising a connector coupled to the sensor for transmitting data from the sensor to a controller.

A $13^{th}$ embodiment is any combination of the first 12 embodiments, wherein the adaptor is configured to wirelessly transmit data from the sensor to a remote controller.

A $14^{th}$ embodiment is any combination of the first 13 embodiments, wherein the valve is a blowdown valve.

A $15^{th}$ embodiment is any combination of the first 14 embodiments, wherein the engine is a diesel engine.

In another aspect, a first embodiment is a system for monitoring an engine. The system comprises a controller configured to receive peak firing pressure data from a plurality of cylinders in the engine and a processor and a computer-readable data storage device storing program instructions that, when executed by the processor, the program instructions: store the peak firing pressure data captured by the controller; and determine a condition of the engine based on the peak firing pressure.

A second embodiment is the first embodiment, wherein the program instructions combine the peak firing pressures from each of the cylinders into at least one parameter that represents the condition of the engine.

A third embodiment is any combination of the first two embodiments, wherein the program instructions determine an average of the peak pressures of the cylinders and compares each of the peak firing pressures with said average.

A 4th embodiment is any combination of the first 3 embodiments, wherein the program instructions determine whether the peak firing pressure of each cylinder is equal to, above, or below the average peak firing pressure.

A 5th embodiment is any combination of the first 4 embodiments, wherein the program instructions determine whether the peak firing pressure of each cylinder is within a threshold amount of the average peak firing pressure.

A 6th embodiment is any combination of the first 5 embodiments, wherein the threshold amount is about 2% to about 10%.

A 7th embodiment is any combination of the first 6 embodiments, wherein the threshold amount is about 5%.

An 8th embodiment is any combination of the first 7 embodiments, wherein the program instructions calculate a number of cylinders that are outside of the threshold amount of the average peak firing pressure.

A 9th embodiment is any combination of the first 8 embodiments, wherein the program instructions compare said number of cylinders outside of the threshold amount of the average peak firing pressure with a total number of cylinders in the engine.

A 10th embodiment is any combination of the first 9 embodiments, wherein the program instructions calculate a condition of the engine based on such comparison.

An 11th embodiment is any combination of the first 10 embodiments, wherein the controller displays the condition of the engine as a visual indicator on a monitor.

A 12th embodiment is any combination of the first 11 embodiments, wherein the program instructions generate a corrective action based on the condition of the engine and displays that corrective action on the monitor.

A 13th embodiment is any combination of the first 12 embodiments, wherein the engine comprises two or more banks of cylinders with each bank of cylinder having a common crank shaft.

A 14th embodiment is any combination of the first 13 embodiments, wherein the program instructions: determines an average of the peak pressures of the cylinders with each bank of cylinders and compares each of the peak firing pressures with said average, determines whether the peak firing pressure of each cylinder is equal to, above, or below the average peak firing pressure of each bank of cylinders; and determines whether the peak firing pressure of each cylinder is within a threshold amount of the average peak firing pressure of each bank of cylinders.

In another aspect, a first embodiment is a system for monitoring an engine. The system comprises a plurality of sensors each coupled to a cylinder of the engine and configured to detect pressure data from each cylinder, a controller coupled to the sensors and configured to receive the pressure data and a monitor coupled to the controller for displaying the pressure data.

A second embodiment is the first embodiment, wherein the pressure data comprises a peak firing pressure of each cylinder.

A third embodiment is any combination of the first two embodiments, further comprising a processor and a computer-readable data storage device storing program instructions that, when executed by the processor, the program instructions: store the peak firing pressures captured by the controller; and determine a condition of the engine based on the peak firing pressures.

A 4th embodiment is any combination of the first 3 embodiments, wherein the program instructions combine the peak firing pressures from each of the cylinders into at least one parameter that represents the condition of the engine.

A 5th embodiment is any combination of the first 4 embodiments, wherein said parameter is based on a difference between the peak firing pressures of the cylinders.

A 6th embodiment is any combination of the first 5 embodiments, wherein said parameter is based on a magnitude of said difference between the peak firing pressures.

A 7th embodiment is any combination of the first 6 embodiments, wherein the program instructions determine an average of the peak pressures of the cylinders and compare each of the peak firing pressures with said average.

An 8th embodiment is any combination of the first 7 embodiments, wherein the controller displays said condition of the engine on the monitor.

A 9th embodiment is any combination of the first 8 embodiments, wherein the controller displays the peak firing pressures of each cylinder on the monitor.

A 10th embodiment is any combination of the first 9 embodiments, wherein the controller converts the peak firing pressure of each cylinder into a visual indicator and displays the visual indicator on the monitor.

An 11th embodiment is any combination of the first 10 embodiments, wherein the visual indicator is based on a normal peak firing pressure for each cylinder.

A 12th embodiment is any combination of the first 11 embodiments, wherein the visual indicator indicates whether the peak firing pressure is equal to, above, or below the normal peak firing pressure.

A 13th embodiment is any combination of the first 12 embodiments, wherein the visual indicator indicates whether the peak firing pressure is within a threshold amount of the normal peak firing pressure.

A 14th embodiment is any combination of the first 13 embodiments, wherein the program instructions quantify a magnitude of said condition of the engine.

A 15th embodiment is any combination of the first 14 embodiments, further comprising a data storage device coupled to the processor that comprises historical data related to the peak firing pressures, wherein the at least one parameter is based, at least in part, on the historical data.

A 16th embodiment is any combination of the first 15 embodiments, wherein the program instructions generate a corrective action based on the condition of the engine and display that corrective action on the monitor.

A 17th embodiment is any combination of the first 16 embodiments, further comprising a mobile device, wherein the monitor is disposed on the mobile device and the controller wirelessly transmits the pressure data to the mobile device.

An 18th embodiment is any combination of the first 17 embodiments, wherein the plurality of sensors are each configured for coupling to a blowdown valve associated with one of the cylinders of the engine.

A 19th embodiment is any combination of the first 18 embodiments, wherein the engine is a diesel engine.

The invention claimed is:

1. A system for monitoring an engine comprising a plurality of cylinders, the system comprising:
   a plurality of sensors each coupled to one of the cylinders of the engine and configured to detect a peak firing pressure from each cylinder;
   a controller coupled to the sensors and configured to calculate an average of the peak firing pressures of the cylinders and determine a condition of the engine based at least in part on said average peak firing pressure, an actual peak firing pressure from each cylinder and a total number of cylinders in the engine; and a monitor coupled to the controller for displaying the pressure data.

2. The system of claim 1, further comprising a processor and a computer-readable data storage device storing program instructions that, when executed by the processor, the program instructions:
store the peak firing pressures captured by the controller; and
determine the condition of the engine based on the peak firing pressures.

3. The system of claim 2, wherein the program instructions combine the peak firing pressures from each of the cylinders into at least one parameter that represents the condition of the engine.

4. The system of claim 3, wherein said parameter is based on a difference between the peak firing pressures of the cylinders.

5. The system of claim 4, wherein said parameter is based on a magnitude of said difference between the peak firing pressures.

6. The system of claim 3, wherein the program instructions compares each of the peak firing pressures with said average.

7. The system of claim 6, wherein the controller displays said condition of the engine on the monitor.

8. The system of claim 7, wherein the controller displays the peak firing pressures of each cylinder on the monitor and converts the peak firing pressure of each cylinder into a visual indicator and displays the visual indicator on the monitor.

9. The system of claim 8, wherein the visual indicator is based on the average peak firing pressure for each cylinder.

10. The system of claim 8, wherein the visual indicator indicates whether the peak firing pressure is equal to, above, or below the average peak firing pressure.

11. The system of claim 8, wherein the visual indicator indicates whether the peak firing pressure is within a threshold amount of the average peak firing pressure.

12. The system of claim 2, wherein the program instructions quantify a magnitude of said condition of the engine.

13. The system of claim 2, wherein the program instructions generate a corrective action based on the condition of the engine and displays that corrective action on the monitor.

14. The system of claim 2, wherein the engine comprises two or more banks of cylinders with each bank of cylinders being set at a different angle from a common crank shaft, wherein the program instructions:
store the peak firing pressures of each of the cylinders captured by the controller; and
determine a condition of each bank of cylinders based on the peak firing pressures.

15. The system of claim 1, wherein the controller compares a difference between the actual peak firing pressure of each cylinder and the average peak firing pressure to determine whether a given cylinder is an outlier and wherein the controller determines an overall condition of the engine based on a number of the outliers and the total number of cylinders in the engine.

16. A system for monitoring an engine, the system comprising:
a controller configured to receive a peak firing pressure data from each of a plurality of cylinders in the engine; and
a processor and a computer-readable data storage device storing program instructions that, when executed by the processor, the program instructions:
store the peak firing pressure of each of the cylinder's data captured by the controller;
calculate an average of the peak firing pressure of the cylinders;
compares each of the peak firing pressures with said average; and
determine a condition of the engine based on the peak firing pressure, an actual peak firing pressure from each cylinder and a total number of cylinders in the engine.

17. The system of claim 16, wherein the program instructions combine the peak firing pressures from each of the cylinders into at least one parameter that represents the condition of the engine.

18. The system of claim 16, wherein the program instructions determine whether the peak firing pressure of each cylinder is equal to, above, or below the average of the peak firing pressure of the cylinders.

19. The system of claim 16, wherein the program instructions determine whether the peak firing pressure of each cylinder is within a threshold amount of the average of the peak firing pressure of the cylinders.

20. The system of claim 16, wherein the program instructions calculate a number of cylinders that are outside of the threshold amount of the average of the peak firing pressure of the cylinders.

21. The system of claim 20, wherein the program instructions compare said number of cylinders outside of the threshold amount of the average of the peak firing pressure of the cylinders with a total number of cylinders in the engine.

22. The system of claim 21, wherein the program instructions calculate a condition of the engine based on such comparison and the controller displays the condition of the engine as a visual indicator on a monitor.

23. The system of claim 21, wherein the program instructions generate a corrective action based on the condition of the engine and displays that corrective action on the monitor.

24. The system of claim 16, wherein the engine comprises two or more banks of cylinders with each bank of cylinders is set at a different angle from a common crank shaft.

25. The system of claim 24, wherein the program instructions:
determines an average of the peak pressures of the cylinders within each bank of cylinders and compares each of the peak firing pressures with said average;
determines whether the peak firing pressure of each cylinder is equal to, above, or below the average peak firing pressure of each bank of cylinders; and
determines whether the peak firing pressure of each cylinder is within a threshold amount of the average peak firing pressure of each bank of cylinders.

26. The system of claim 16, wherein the computer-readable data storage device stores program instructions that, when executed by the processor: compares a difference between the actual peak firing pressure of each cylinder and the average peak firing pressure to determine whether a given cylinder is an outlier and wherein the controller determines an overall condition of the engine based on a number of the outliers and the total number of cylinders in the engine.

* * * * *